(12) United States Patent
Epstein et al.

(10) Patent No.: US 9,001,286 B2
(45) Date of Patent: Apr. 7, 2015

(54) BRIGHTNESS ENHANCING FILM AND FILM BASED DIFFUSER FOR IMPROVED ILLUMINATION UNIFORMITY OF DISPLAYS

(75) Inventors: Kenneth A. Epstein, St. Paul, MN (US); Stephen J. Etzkorn, Woodbury, MN (US); Eric W. Nelson, Stillwater, MN (US); Mark D. Gehisen, Eagan, MN (US); Brian G. Koethe, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1036 days.

(21) Appl. No.: 12/867,111

(22) PCT Filed: Feb. 13, 2009

(86) PCT No.: PCT/US2009/034047
§ 371 (c)(1),
(2), (4) Date: Oct. 29, 2010

(87) PCT Pub. No.: WO2009/102951
PCT Pub. Date: Aug. 20, 2009

(65) Prior Publication Data
US 2011/0037736 A1 Feb. 17, 2011

Related U.S. Application Data

(60) Provisional application No. 61/029,071, filed on Feb. 15, 2008.

(51) Int. Cl.
*G02F 1/1335* (2006.01)
*G02B 5/02* (2006.01)
*G02B 5/04* (2006.01)

(52) U.S. Cl.
CPC .......... *G02F 1/133606* (2013.01); *G02B 5/021* (2013.01); *G02B 5/0242* (2013.01);
(Continued)

(58) Field of Classification Search
USPC ...................................... 349/64, 65
See application file for complete search history.

(56) References Cited

U.S. PATENT DOCUMENTS 5,751,388 A 5/1998 Larson
5,793,456 A 8/1998 Broer
(Continued)

FOREIGN PATENT DOCUMENTS

JP 2004-258105 9/2004
JP 2007-218984 8/2007
(Continued)

OTHER PUBLICATIONS

Search Report for PCTUS2009034047, 7 pages, Nov. 5, 2009.
(Continued)

*Primary Examiner* — Lucy Chien
(74) *Attorney, Agent, or Firm* — Jay R. Pralle; Lisa P. Fulton

(57) ABSTRACT

An optical device has a first film (200) that has a first side and a second side. When illuminated by light (204) at the first side, the first film is characterized by a first fraction of broadly diffused transmitted light (206) and a second fraction of narrowly diffused transmitted light (208). A second film (202) is disposed to the second side of the first film. The second film has at least one free surface that diverts light. In some embodiments, the first film has a diffuse scattering optical density between 0.5 and 3. The device finds use in spreading and making light uniform in a backlight in a display such as a liquid crystal display.

38 Claims, 14 Drawing Sheets

(52) U.S. Cl.
CPC .............. *G02B5/0278* (2013.01); *G02B 5/045* (2013.01); *G02F 1/133611* (2013.01); *G02F 2001/133507* (2013.01)

(56) References Cited

U.S. PATENT DOCUMENTS

| | | | |
|---|---|---|---|
| 5,825,543 | A | 10/1998 | Ouderkirk |
| 5,867,316 | A | 2/1999 | Carlson |
| 5,882,774 | A | 3/1999 | Jonza |
| 6,122,103 | A | 9/2000 | Perkins |
| 7,436,469 | B2 | 10/2008 | Gehlsen |
| 7,446,827 | B2 | 11/2008 | Ko |
| 7,478,913 | B2 | 1/2009 | Epstein |
| 7,766,528 | B2 | 8/2010 | Epstein |
| 7,789,538 | B2 | 9/2010 | Epstein |
| 2002/0159019 | A1 | 10/2002 | Pokorny |
| 2003/0118805 | A1 | 6/2003 | Kretman |
| 2005/0018431 | A1 | 1/2005 | Shiang |
| 2005/0243551 | A1* | 11/2005 | Onishi et al. .................. 362/244 |
| 2005/0270654 | A1 | 12/2005 | Goto |
| 2007/0019131 | A1 | 1/2007 | Choi |
| 2007/0030415 | A1 | 2/2007 | Epstein |
| 2007/0097708 | A1 | 5/2007 | Shim |
| 2008/0111947 | A1 | 5/2008 | Epstein |
| 2010/0139165 | A1 | 6/2010 | Oyama |

FOREIGN PATENT DOCUMENTS

| | | |
|---|---|---|
| JP | 2007-265783 | 10/2007 |
| JP | 2007-293172 | 11/2007 |
| JP | 2007-294465 | 11/2007 |
| JP | 2008-032849 | 2/2008 |
| WO | WO 2007-002317 | 1/2007 |
| WO | WO 2008-011497 | 1/2008 |
| WO | WO 2008-061125 | 5/2008 |
| WO | WO 2008-102762 | 8/2008 |
| WO | WO 2009-009774 | 1/2009 |

OTHER PUBLICATIONS

Written Opinion for PCTUS2009034047, 12 pages, Nov. 5, 2009.

* cited by examiner

BRIGHTNESS ENHANCING FILM AND FILM BASED DIFFUSER FOR IMPROVED ILLUMINATION UNIFORMITY OF DISPLAYS

RELATED APPLICATIONS

This application is a national stage filing under 35 U.S.C. 371 of PCT/US2009/034047, filed on Feb. 13, 2009, which claims priority to U.S. Provisional Patent Application No. 61/029,071, filed on Feb. 15, 2008, the disclosure of which is incorporated by reference herein in its/their entirety.

FIELD OF THE INVENTION

The invention relates to optical displays, and more particularly to liquid crystal displays (LCDs) that are directly illuminated by light sources from behind, such as may be used in LCD monitors and LCD televisions.

BACKGROUND

Some display systems, for example liquid crystal displays (LCDs), are illuminated from behind. Such displays find widespread application in many devices such as laptop computers, hand-held calculators, digital watches, televisions and the like. Some backlit displays include a light source that is located to the side of the display, with a light guide positioned to guide the light from the light source to the back of the display panel. Other backlit displays, for example some LCD monitors and LCD televisions (LCD-TVs), are directly illuminated from behind using a number of light sources positioned behind the display panel. This latter arrangement is increasingly common with larger displays because the light power requirements, needed to achieve a certain level of display brightness, increase with the square of the display size, whereas the available real estate for locating light sources along the side of the display only increases linearly with display size. In addition, some display applications, such as LCD-TVs, require that the display be bright enough to be viewed from a greater distance than other applications. In addition, the viewing angle requirements for LCD-TVs are generally different from those for LCD monitors and hand-held devices.

Many LCD monitors and LCD-TVs are illuminated from behind by a number of cold cathode fluorescent lamps (CCFLs). These light sources are linear and stretch across the full width of the display, with the result that the back of the display is illuminated by a series of bright stripes separated by darker regions. Such an illumination profile is not desirable, and so a diffuser plate is typically used to smooth the illumination profile at the back of the LCD device. The diffuser plate is generally relatively thick and heavy compared to other light management elements between the lamps and the LCD panel.

A diffuse reflector is used behind the lamps to direct light towards the viewer, with the lamps being positioned between the reflector and the diffuser. The separation between the diffuse reflector and the diffuser is limited by the desired brightness uniformity of the light emitted from the diffuser. If the separation is too small, then the illuminance becomes less uniform, thus spoiling the image viewed by the viewer. This comes about because there is insufficient space for the light to spread uniformly between the lamps.

There remains a need to reduce the reliance on a heavy diffuser plate placed between the lamps and the LCD panel.

SUMMARY OF THE INVENTION

One embodiment of the invention is directed to an optical device that has a first film having a first side and a second side. When illuminated by light at the first side, the first film is characterized by a first fraction of broadly diffused transmitted light and a second fraction of narrowly diffused transmitted light. A second film is disposed to the second side of the first film. The second film has at least one free surface that diverts light.

Another embodiment of the invention is directed to an optical device that has a first film having a first side and a second side. The first film also has a diffuse scattering optical density between 0.5 and 3. A second film is disposed proximate the first side of the first film with at least one free light diverting surface that diverts light transmitted through the first film.

Another embodiment of the invention is directed to an optical device that includes a light diffusing means for diffusing light by forming a first broadly diffuse fraction and a second narrowly diffuse fraction when illuminated by input light. A first light diverting means diverts at least a portion of the light transmitted through the light diffusing means.

The above summary of the present invention is not intended to describe each illustrated embodiment or every implementation of the present invention. The following figures and detailed description more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
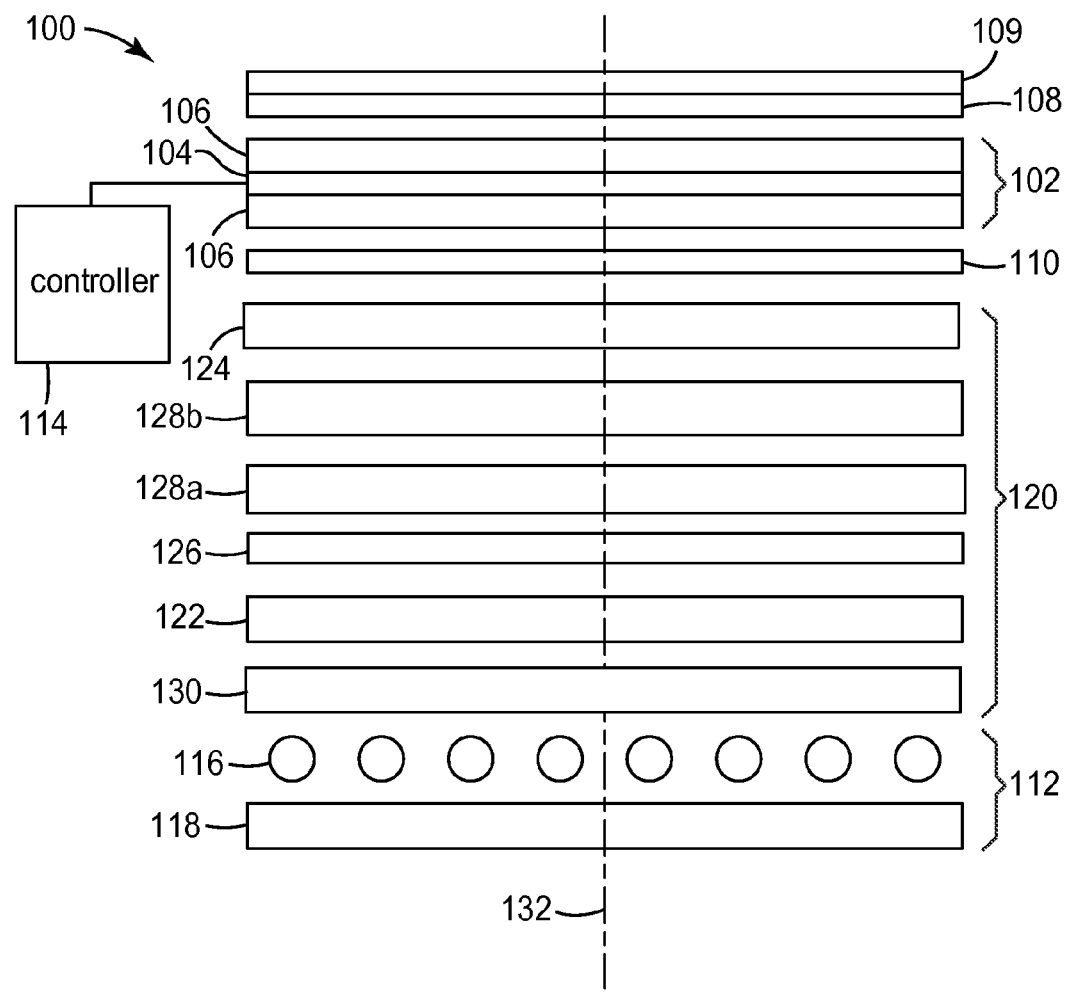
FIG. 1 schematically illustrates a back-lit liquid crystal display device that uses a punch-through diffuser according to principles of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to display panels, such as liquid crystal displays (LCDs, or LC displays), and is particularly applicable to LCDs that are directly illuminated from behind, for example as are used in LCD monitors and LCD televisions (LCD-TVs). More specifically, the invention is directed to the management of light generated by a direct-lit backlight for illuminating an LC display. An arrangement of light management films is typically positioned between the backlight and the display panel itself. The arrangement of light management films, which may be laminated together or may be free standing, includes a diffuser layer and at least one other film that has a free surface that diverts light.

A schematic exploded view of an exemplary embodiment of a direct-lit display device 100 is presented in FIG. 1. Such a display device 100 may be used, for example, in an LCD monitor or LCD-TV. The display device 100 may be based on the use of an LC panel 102, which typically comprises a layer of LC 104 disposed between panel plates 106. The plates 106 are often formed of glass, and may include electrode structures and alignment layers on their inner surfaces for controlling the orientation of the liquid crystals in the LC layer 104. The electrode structures are commonly arranged so as to define LC panel pixels, areas of the LC layer where the orientation of the liquid crystals can be controlled independently of adjacent areas. A color filter may also be included with one or more of the plates 106 for imposing color on the image displayed.

An upper absorbing polarizer 108 is positioned above the LC layer 104 and a lower absorbing polarizer 110 is positioned below the LC layer 104. In the illustrated embodiment, the upper and lower absorbing polarizers are located outside the LC panel 102. The absorbing polarizers 108, 110 and the LC panel 102 in combination control the transmission of light from the backlight 112 through the display 100 to the viewer. For example, the absorbing polarizers 108, 110 may be arranged with their transmission axes perpendicular. In an unactivated state, a pixel of the LC layer 104 may not change the polarization of light passing therethrough. Accordingly, light that passes through the lower absorbing polarizer 110 is absorbed by the upper absorbing polarizer 108. When the pixel is activated, on the other, hand, the polarization of the light passing therethrough is rotated, so that at least some of the light that is transmitted through the lower absorbing polarizer 110 is also transmitted through the upper absorbing polarizer 108. Selective activation of the different pixels of the LC layer 104, for example by a controller 114, results in the light passing out of the display at certain desired locations, thus forming an image seen by the viewer. The controller may include, for example, a computer or a television controller that receives and displays television images. One or more optional layers 109 may be provided over the upper absorbing polarizer 108, for example to provide mechanical and/or environmental protection to the display surface. In one exemplary embodiment, the layer 109 may include a hardcoat over the absorbing polarizer 108.

It will be appreciated that some type of LC displays may operate in a manner different from that described above. For example, the absorbing polarizers may be aligned parallel and the LC panel may rotate the polarization of the light when in an unactivated state. Regardless, the basic structure of such displays remains similar to that described above.

The backlight 112 includes a number of light sources 116 that generate the light that illuminates the LC panel 102. The light sources 116 used in a LCD-TV or LCD monitor are often linear, cold cathode, fluorescent tubes that extend along the height of the display device 100. Other types of light sources may be used, however, such as filament or arc lamps, light emitting diodes (LEDs), flat fluorescent panels or external fluorescent lamps. This list of light sources is not intended to be limiting or exhaustive, but only exemplary.

The backlight 112 may also include a reflector 118 for reflecting light propagating downwards from the light sources 116, in a direction away from the LC panel 102. The reflector 118 may also be useful for recycling light within the display device 100, as is explained below. The reflector 118 may be a specular reflector or may be a diffuse reflector. One example of a specular reflector that may be used as the reflector 118 is Vikuiti™ Enhanced Specular Reflection (ESR) film available from 3M Company, St. Paul, Minn. Examples of suitable diffuse reflectors include polymers, such as PET, PC, PP, PS loaded with diffusely reflective particles, such as titanium dioxide, barium sulphate, calcium carbonate or the like. Other examples of diffuse reflectors, including microporous materials and fibril-containing materials, are discussed in co-owned U.S. Patent Application Publication 2003/0118805 A1, incorporated herein by reference.

An arrangement 120 of light management films, which may also be referred to as a light management unit, is positioned between the backlight 112 and the LC panel 102. The light management films affect the light propagating from backlight 112 so as to improve the operation of the display device 100. The light management unit 120 includes a punchthrough diffuser layer 122, described further below.

The light management unit 120 may also include a reflective polarizer 124. The light sources 116 typically produce unpolarized light but the lower absorbing polarizer 110 only transmits a single polarization state, and so about half of the light generated by the light sources 116 is not transmitted through to the LC layer 104. The reflecting polarizer 124, however, may be used to reflect the light that would otherwise be absorbed in the lower absorbing polarizer, and so this light may be recycled by reflection between the reflecting polarizer 124 and the reflector 118. At least some of the light reflected by the reflecting polarizer 124 may be depolarized, and subsequently returned to the reflecting polarizer 124 in a polarization state that is transmitted through the reflecting polarizer 124 and the lower absorbing polarizer 110 to the LC layer 104. In this manner, the reflecting polarizer 124 may be used to increase the fraction of light emitted by the light sources 116 that reaches the LC layer 104, and so the image produced by the display device 100 is brighter.

Any suitable type of reflective polarizer may be used, for example, multilayer optical film (MOF) reflective polarizers; diffusely reflective polarizing film (DRPF), such as continuous/disperse phase polarizers, wire grid reflective polarizers or cholesteric reflective polarizers.

Both the MOF and continuous/disperse phase reflective polarizers rely on the difference in refractive index between at least two materials, usually polymeric materials, to selectively reflect light of one polarization state while transmitting light in an orthogonal polarization state. Some examples of MOF reflective polarizers are described in co-owned U.S. Pat. No. 5,882,774, incorporated herein by reference. Commercially available examples of MOF reflective polarizers include Vikuiti™ DBEF-D200 and DBEF-D440 multilayer reflective polarizers that include diffusive surfaces, available from 3M Company, St. Paul, Minn.

Examples of DRPF useful in connection with the present invention include continuous/disperse phase reflective polarizers as described in co-owned U.S. Pat. No. 5,825,543, incorporated herein by reference, and diffusely reflecting multilayer polarizers as described in e.g. co-owned U.S. Pat. No. 5,867,316, also incorporated herein by reference. Other suitable types of DRPF are described in U.S. Pat. No. 5,751,388.

Some examples of wire grid polarizers useful in connection with the present invention include those described in U.S. Pat. No. 6,122,103. Wire grid polarizers are commercially available from, inter alia, Moxtek Inc., Orem, Utah.

Some examples of cholesteric polarizers useful in connection with the present invention include those described in, for example, U.S. Pat. No. 5,793,456, and U.S. Patent Publication No. 2002/0159019. Cholesteric polarizers are often provided along with a quarter wave retarding layer on the output side, so that the light transmitted through the cholesteric polarizer is converted to linear polarization.

In some embodiments, the reflective polarizer 124 may provide diffusion, for example with a diffusing surface facing the backlight 112. In other embodiments, the reflective polarizer 124 may be provided with a brightness enhancing surface that increases the gain of the light that passes through the reflective polarizer 124. For example, the upper surface of the reflective polarizer 124 may be provided with a prismatic brightness enhancing surface or with a collimating beaded diffuser surface. Brightness enhancing surfaces are discussed in greater detail below. In other embodiments, the reflective polarizer may be provided with a diffusing feature, such as a diffusing surface or volume, on the side facing the backlight 112 and with a brightness enhancing feature, such as a prismatic surface or collimated beaded diffuser surface, on the side facing the LC panel 102.

A polarization control layer 126 may be provided in some exemplary embodiments, for example between the punch-through diffuser layer 122 and the reflective polarizer 124. Examples of polarization control layer 126 include a quarter wave retarding layer and a polarization rotating layer, such as a liquid crystal polarization rotating layer. A polarization control layer 126 may be used to change the polarization of light that is reflected from the reflective polarizer 124 so that an increased fraction of the recycled light is transmitted through the reflective polarizer 124.

The light management unit 120 may also include a brightness enhancing layer 128a. A brightness enhancing layer can include a surface structure that redirects off-axis light in a direction closer to the axis 132 of the display. This increases the amount of light propagating on-axis through the LC layer 104, thus increasing the brightness of the image seen by the viewer. One example is a prismatic brightness enhancing layer, which has a number of prismatic ridges that redirect the illumination light, through refraction and reflection. Examples of prismatic brightness enhancing layers that may be used in the display device include the Vikuiti™ BEFII and BEFIII family of prismatic films available from 3M Company, St. Paul, Minn., including BEFII 90/24, BEFII 90/50, BEFIIIM 90/50, and BEFIIIT.

A prismatic brightness enhancing layer typically provides optical gain by compressing the angular extent of the light in one dimension. A second brightness enhancing layer 128b may also be included in the arrangement 120 of light management layers, in which a prismatic brightness enhancing layer is arranged with its prismatic structure oriented orthogonally to the prismatic structure of the first brightness enhancing layer 128a. Such a configuration provides an increase in the optical gain of the display unit by compressing the angular extent of the light in two dimensions. In the illustrated embodiment, the brightness enhancing layers 128a, 128b are positioned between the backlight 112 and the reflective polarizer 124. In other embodiments, the brightness enhancing layers 128a and 128b may be disposed between the reflective polarizer 124 and the LC panel 102.

The different layers in the light management unit may be free standing. In other embodiments, two or more of the layers in the light management unit may be laminated together, for example as discussed in co-owned U.S. patent application Ser. No. 10/966,610, incorporated herein by reference. In other exemplary embodiments, the light management unit may include two subassemblies separated by a gap, for example as described in co-owned U.S. patent application Ser. No. 10/965,937, incorporated herein by reference.

Conventionally, the spacing between the light sources 116 and the diffuser layer 122, the spacing between adjacent light sources 116 and the diffuser transmission are significant factors considered in designing the display for a given value of brightness and uniformity of illumination. Generally, a strong diffuser, i.e., a diffuser that diffuses a higher fraction of the incident light, will improve the uniformity but will also result in reduced brightness, because the high diffusing level is accompanied by strong back diffusion and a concomitant increase in losses.

Under normal diffusion conditions, the variations in brightness seen across a screen are characterized by brightness maxima located above the light sources, and brightness minima located between the light sources. An enhanced uniformity film (EUF) 130 may be positioned between the light sources 116 and the diffuser layer 122 to reduce the nonuniformity in the illumination of the display panel 102. Either face of the EUF 130, namely the side facing towards the light sources 116 and the side facing towards the display panel 102, may be a light-diverting surface. The light diverting surfaces are formed by a number of light diverting elements that refractively divert light passing from one side of the EUF 130 to another in a manner that reduces the illumination non-uniformity. The light diverting elements comprise a portion of the EUF surface that is non-parallel to the plane of the EUF 130. Different embodiments of EUF are described further in U.S. patent application Ser. Nos. 11/129,942; 11/560,260; 11/560,234; 11/560,271; and 11/560,250, and PCT Application No. US2007/084645, incorporated herein by reference.

Figure 2A:
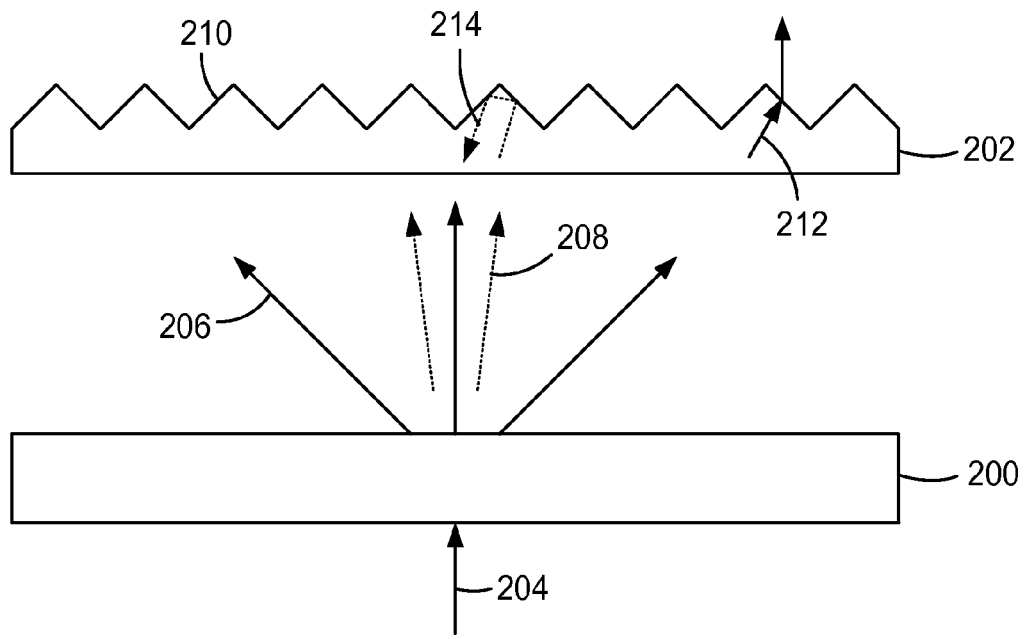
FIG. 2A schematically illustrates the operation of a punch-through diffuser and a light diverting film.

One exemplary embodiment of a punch-through diffuser 200 is schematically illustrated in FIG. 2A, along with a second film 202 that has a free surface 210 that diverts light.

A punch-through diffuser is a diffusing element that diffuses a first fraction of incident light with a broad diffusion characteristic. The remaining fraction is either not diffused or is only narrowly diffused. This is schematically represented in FIG. 2A which shows a light ray 204 incident on the punch-through diffuser 200. The transmitted light is broadly diffused (solid rays 206) or narrowly diffused (dotted rays 208).

Figure 2B:
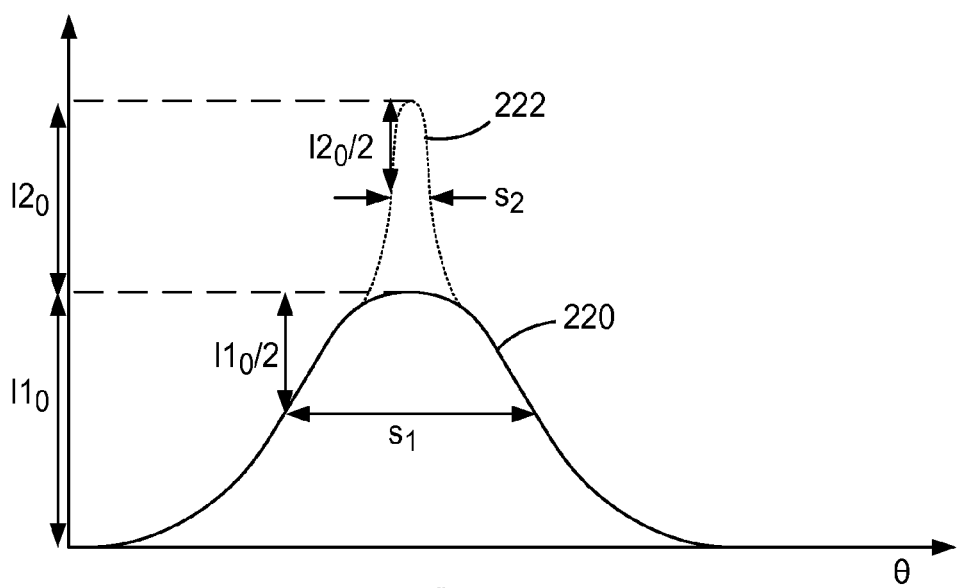
FIG. 2B schematically illustrates the angle-dependent luminance profile of light after passing through a punch-through diffuser.

A schematic polar plot is presented in FIG. 2B, which shows the illuminance of the transmitted light as a function of polar angle, $\theta$. The illuminance plot is formed of two components. The first component 220 is a broad diffusion pattern. The peak height of the first component 220 is $I1_0$. The half height, full width of the first component, i.e. the width between the two points at the half the maximum height, is $s_1$. The second component 222 is a narrow diffusion pattern. The peak height of the second component is $I2_0$. The half height, full width of the first component, i.e. the width between the two points at half the maximum height, is $s_2$. Note that the height, $I2_0$, of the second component 222 is the height of the second component in the absence of the first component 220. The behavior of this punch-through diffuser contrasts with conventional diffusers used in displays, which transmit only one diffused component. The ratio $s_1/s_2$ may be greater than three, may be greater than five and in some embodiments may be greater than ten. Although not intended as a limit, in some embodiments, the fraction of optical power in the first component, for example as measured in Watts, may be between 1 and 10 times the optical power in the second component, although the relative powers in the different components may also be outside this range. In other embodiments, the fraction of optical power in the first component may be between 1 and 3 times the optical power in the second component.

Figure 2C:
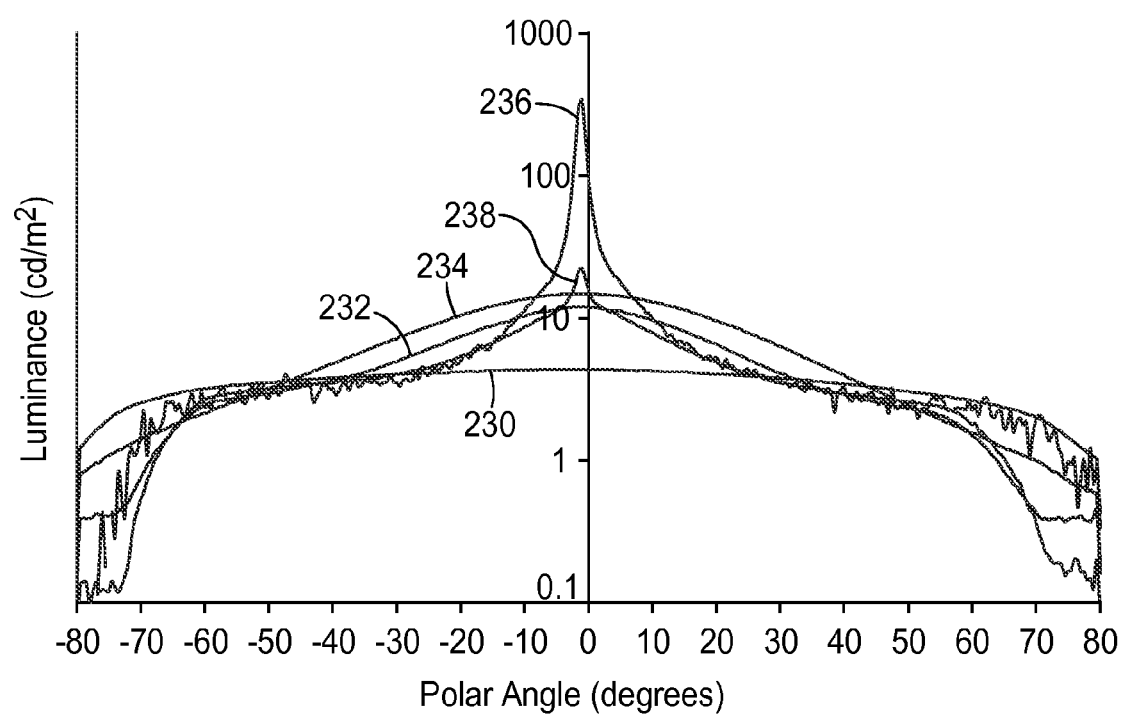
FIG. 2C shows the measured angle-dependent luminance profiles of light after passing through several different types of diffusers.

FIG. 2C shows experimental measurements of luminance measured against polar angle for different embodiments of diffuser. In each case, a diffuser film was illuminated with a collimated beam of white light. A conoscope was used to measure the polar angle dependence of the luminance. It should be noted that the luminance is presented on a logarithmic scale.

The different diffusers used in the experiment are listed below in Table I.

TABLE I

Diffuser Characteristics

| Curve No. | Description |
| --- | --- |
| 230 | Commercial diffuser |
| 232 | Gaussian diffuser |
| 234 | 85% transmission diffuser plate |
| 236 | Punch-through diffuser 1 |
| 238 | Punch-through diffuser 2 |

The commercial diffuser was a 2.0 mm diffuse plate obtained from a Sony KDL-40XBR4 TV. The 85% transmission diffuser plate was a 2 mm thick DR-85C CLAREX® DR-IIIC Light Diffusion filter plate obtained from Astra Products, Inc., Baldwin N.Y.

Punch-through diffusers 1 and 2 (curves 236 and 238) were made by coating 0.005" (125 μm) mil PET with a 25 μm thick UV curable polymer formulation containing different fillers. The punch-through diffusers included a combination of 6 μm polystyrene beads and titanium dioxide particles. This formulation provides a combination of forward and back scattering with the desired amount of direct light transmission. The refractive index difference between the titanium dioxide particles and the UV curable polymer was significantly greater than the refractive index difference between the UV curable polymer and the polystyrene beads. Accordingly, the titanium dioxide beads resulted in broad diffusion while the polystyrene beads resulted in narrow diffusion. If higher levels of titanium dioxide were to be used, then transmission drops and a higher fraction of light is diffused backwards. If higher levels of polystyrene beads were to be used, the transmitted diffusion pattern changes to a Gaussian distribution. However, the combination of the two different components can be tailored to provide the desired two-fraction diffusion characteristic.

The Gaussian diffuser (curve 232) was made using the same process as the punch-through diffusers, but the titanium dioxide particles were omitted and the amount of polystyrene beads was higher than for the punch-through diffusers. The polymer formulations for the punch-through diffusers, PTD1 (curve 236) and PTD2 (curve 238) and the Gaussian diffuser are summarized in Table II. The table lists weight % for each component of the formulation.

TABLE II

Diffuser Formulations

| Material | PTD1 | PTD2 | Gaussian |
| --- | --- | --- | --- |
| PH 6010 | 22 | 19 | 10 |
| SR9003 | 11.05 | 9.05 | 4.5 |
| SR833 | 5 | 5 | 5 |
| SBX-6 | 10 | 15 | 30 |
| 9W162 White | 1.45 | 1.45 | — |
| Dowanol PM | 50.0 | 50.0 | 50 |
| Darcure 4265 | 0.5 | 0.5 | 0.5 |

PH 6010 is an aliphatic urethane acrylate oligomer, supplied by Cognis Corp., Cincinnati, Ohio. SR9003 is a glycol diacrylate monomer supplied by Sartomer Company Inc., Exton Pa. SR833 is a dimethanol diacrylate supplied by Sartomer Company Inc. SBX-6 is a polystyrene bead supplied by Sekisui Plastics Co. Ltd., Tokyo, Japan. 9W162 White is 70% titanium dioxide dispersed in neopentyl glycol diacrylate, available from Penn color, Doylestown, Pa. Dowanol PM is a glycol ether used as a solvent, manufactured by Dow Chemical, Midland Mich. Darcure 4265 is a photoinitiator manufactured by Ciba Specialty Chemicals, Tarrytown, N.Y.

The two-fraction behavior of the punch-through diffusers is clearly seen in FIG. 2C, with a broad diffuse fraction overlayed by a narrowly diffuse fraction.

The diffused light passing to the second film 202 may be diverted by the free surface 210 of the second film 202. The term "diverted" means that the direction of propagation of a light ray just prior to entering the film is different from the direction of the light ray just exiting the film. Some of the light, like ray 212, is transmissively diverted, for example by refraction at a surface that is non-planar. Ray 212 may be diverted through an angle of 20° or more. Other portions of the light, like ray 214 that are more close to being on-axis, may be totally internally reflected by the surface 210. One example of a film that has a free surface that diverts light is a brightness enhancing film, such as BEF, BEFII and BEF III sold by 3M Company, St. Paul, Minn. In some embodiments, the surface 210 may reflect more than 50% of the light transmitted through the punch-through diffuser 200, that is incident substantially on axis, in a direction back towards the punch-through diffuser 200. In some embodiments, the light diverting surface 210 reflects more than 50% of the light that is incident within the angular cone of breadth $s_2$ centered on axis.

Figure 3A:
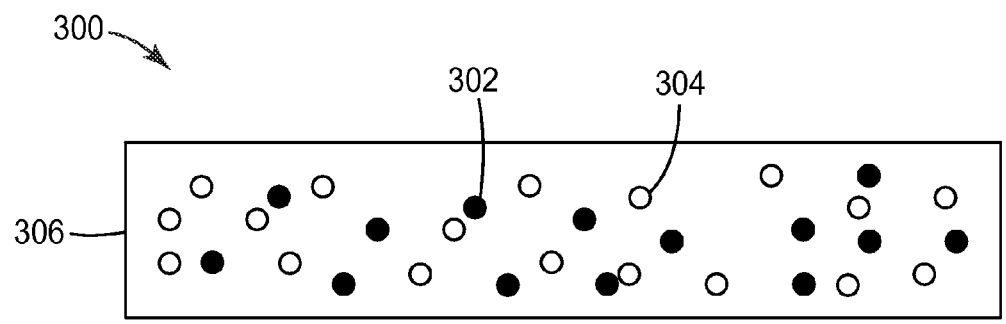
FIGS. 3A-3C schematically illustrate different embodiments of punch-through diffusers according to principles of the present invention.

One embodiment of a punch-through diffuser 300 is schematically illustrated in FIG. 3A. This embodiment of punch-through diffuser 300 is as described in the samples above with respect to FIG. 2C, in which a first set of particles 302 and a second set of particles 304 are embedded within a transparent layer 306. The first set of particles 302 broadly diffuses a first fraction of the light, whereas the second set of particles 304 narrowly diffuses a second fraction of the light. Typically the refractive index difference between the first set of particles 302 and the transparent layer 306 is higher than the refractive index difference between the second set of particles 304 and the transparent layer 306. Examples of suitable materials for the first set of particles include high index glasses such as high-lead glasses, titanium dioxide, indium tin oxide and other metal oxides. The density and size of the particles 302 is selected for the desired broad diffusion characteristic. The particles 302 may also include voids in the diffuser film 300, which also provide a relatively strong refractive index difference. Examples of suitable materials for the second set of particles 304 include polymers, such as polystyrene, polyesters, acrylics, fluorinated polymers and low index glasses such as silica.

Figure 3B:
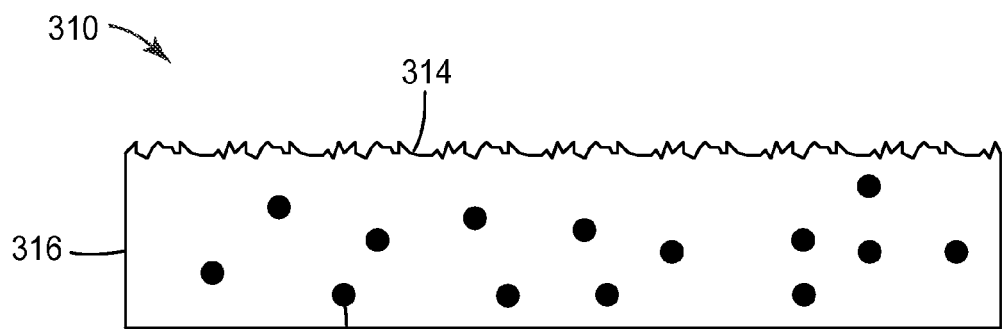

Another embodiment of a punch through diffuser 310 is schematically illustrated in FIG. 3B, in which a first set of diffusing particles 312 is included within a transparent layer 316. One or more of the surfaces 314 of the transparent layer 316 is rough so as to diffuse light that passes through the surface 314. The diffusing surface 314 is associated with a narrow diffusion characteristic while the first set of particles 312 is associated with a broad diffusion characteristic. The diffusing surface may be roughened, for example, via abrasion, or may be formed by bead coating of a particle whose refractive index is close to that of the polymer film.

Figure 3C:
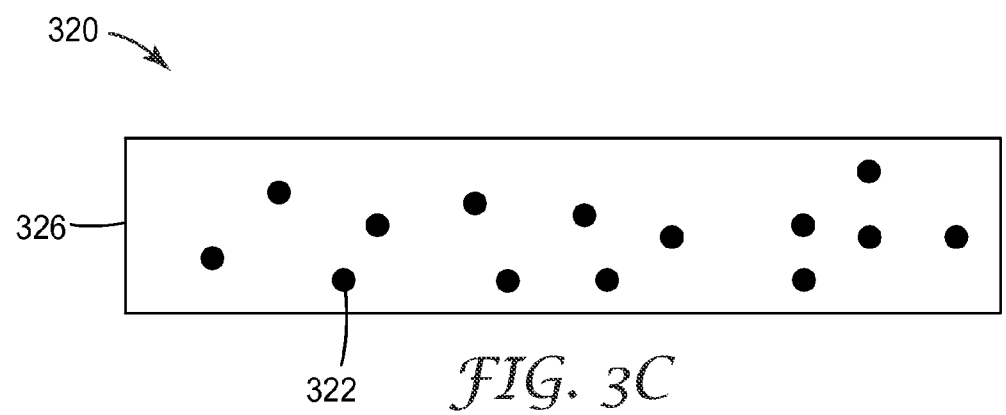

Another embodiment of a punch-through diffuser 320 is schematically illustrated in FIG. 3C, in which a first set of diffusing particles 322 is included within a transparent layer 326. In this case, the first set of diffusing particles 322 is associated with a broad diffusion characteristic while at the same time permitting a second fraction of the incident light to pass through substantially undiffused. In such a case, the diffusion angle of the light in the second fraction is equal to the angular spread of the light incident on the diffuser 320.

In the case of a collimated incident light beam, one can define the beam attenuation in terms of the scattering optical density (OD) of the diffuser. The beam attenuation, A, is the fraction of the incident beam intensity $I_o$ that passes through the diffuser without scattering i.e. the remaining light confined to the incident beam collimation cone. Thus the intensity of the transmitted light beam, I, is given by:

$$I = A I_o, \text{ and}$$

$$OD = \text{Log}(1/A).$$

The attenuation, A, may be expressed as $$A = e^{-x/L},$$

where x is the thickness of the diffuser and L is the mean free path of light between scattering sites. Hence, the optical density, OD, is related to the diffuser thickness and the optical mean free path in the diffuse medium:

$$OD = 0.434(x/L)$$

In the Henyey Greenstein volume diffusion model used below, coefficients u=1/L and G are the parameters that fix the probability distribution of scattering lengths and the probability distribution of scattering angles relative to the incident direction. Ray-trace software simulates the diffusion model by propagating rays in the 3-dimensional virtual space in accord with the probability distributions. In some embodiments, the punch-through diffuser has a scattering optical density of between 0.5 and 3.

Figure 4A:
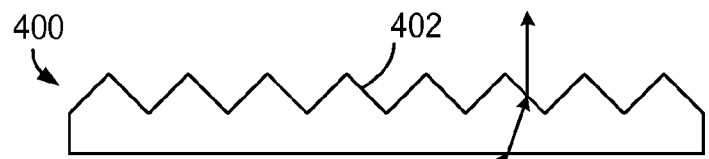
FIGS. 4A-4E schematically illustrate different embodiments of light-diverting layers usable in embodiment of the present invention.

Brightness enhancing films are examples of films that include a free surface that diverts light passing through the film. An example of a brightness enhancing film that is suitable for use along with a punch-through diffuser is a ribbed prismatic film 400, a first embodiment of which schematically illustrated in cross-section in FIG. 4A. In this embodiment, the ribs 402 have the same height which is also constant along the length of the ribs.

Figure 4B:
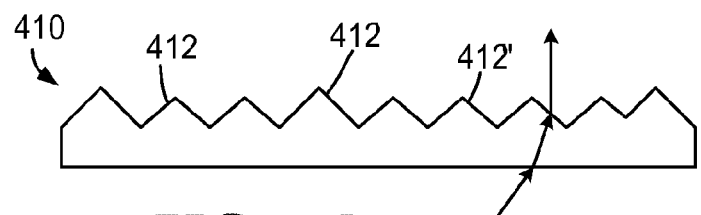

A second embodiment of brightness enhancing film 410 is schematically illustrated in FIG. 4B. In this embodiment the ribs 412 of the film 410 do not all have the same height, some ribs 412' being higher than other ribs 412". An example of this type of film is the BEFII family of brightness enhancing films available from 3M Company, St. Paul, Minn.

Figure 4C:
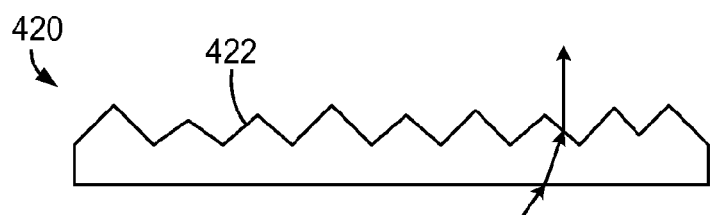

A third embodiment of a brightness enhancing film 420 is schematically illustrated in FIG. 4C. In this embodiment the heights of the ribs 422 vary along the lengths of the ribs. An example of this type of film is the BEFIII family of brightness enhancing films available from 3M Company, St. Paul, Minn.

Figure 4D:
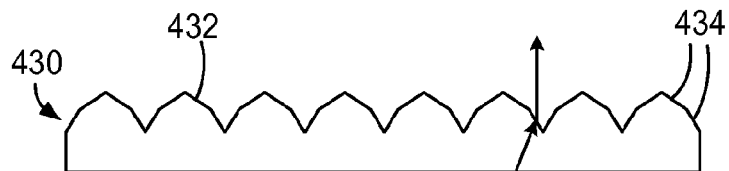

A fourth embodiment of a brightness enhancing film 430 is schematically illustrated in FIG. 4D. In this embodiment, one or both of the sides of the ribs 432 is faceted. In the illustrated embodiment, each side of the ribs 432 includes two facets 434. A rib side may include a different number of facets 434 and the number of facets 434 on one side of a rib 432 may be different from the number of facets on the other side of the rib 432.

Figure 4E:
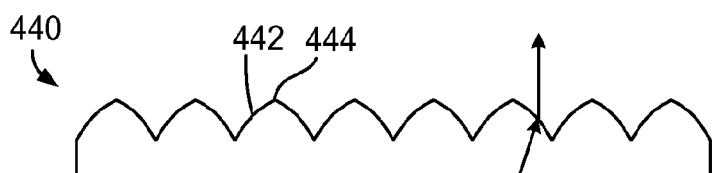

A fifth embodiment of a brightness enhancing film 440 is schematically illustrated in FIG. 4E. In this embodiment, one or both of the sides of the ribs 442 is curved. In the illustrated embodiment, both sides of the ribs 442 are curved and the curved sides form an apex 444.

Different features from these embodiments may be mixed in a brightness enhancing film. For example, a film may contain at least one rib that has one curved side and a faceted side. Also, faceted or curved ribs may have constant height along their lengths or may vary in height along their lengths, and adjacent ribs may have different heights. Furthermore, apices and valleys may be pointed or curved.

Figure 5:
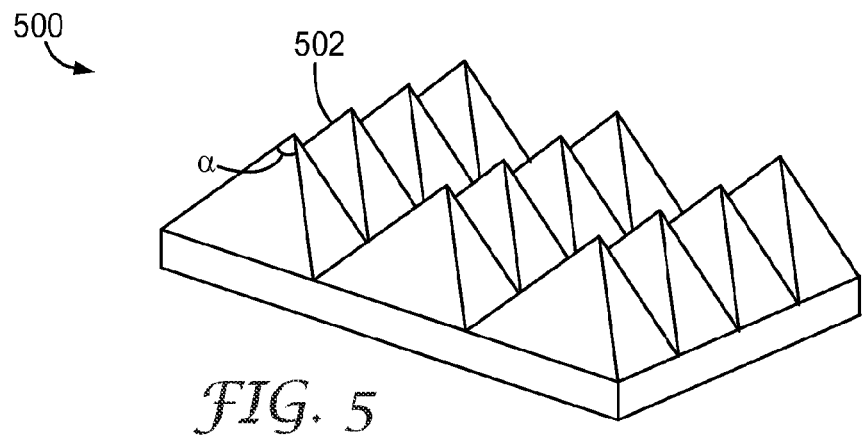
FIG. 5 schematically illustrates an embodiment of a two-dimensional light diverting layer usable in embodiments of the present invention.

The light diverting film includes a free, light diverting surface that need not be in the form of a ribbed surface, but may also be in other forms. For example, a light-diverting film can include a non-planar surface that has a two-dimensional pattern, for example a number of pyramidal structures may be disposed on the surface, as is schematically illustrated in FIG. 5. In this particular example, the film 500 includes a surface formed of a number of square pyramids 502. The apex angle on a surface of the pyramid, $\alpha$, may be 90°, although this need not be the case and the value of $\alpha$ may be less than or greater than 90°.

In other embodiments, the pyramids may have another number of sides. For example, the pyramids may have three or five sides. In the particular case where the pyramids have three sides and the apex angles are 90°, then the shapes on the film surface are like the corners of cubes, and may act as corner-cube retroreflectors. Of course, the apex angles may take on different values. In other embodiments, different types of pyramids may be used on a single film, for example pyramids having different number of sides and/or different apex angles may be present on the same film. In other embodiments, the pyramids may be truncated.

It will be appreciated that non-planar surfaces having other shapes may also be used on the light diverting film in addition to those discussed in detail here. The use of illustrative examples of shapes on a light diverting film is not intended to limit the invention only to those examples illustrated herein.

Figure 6A:
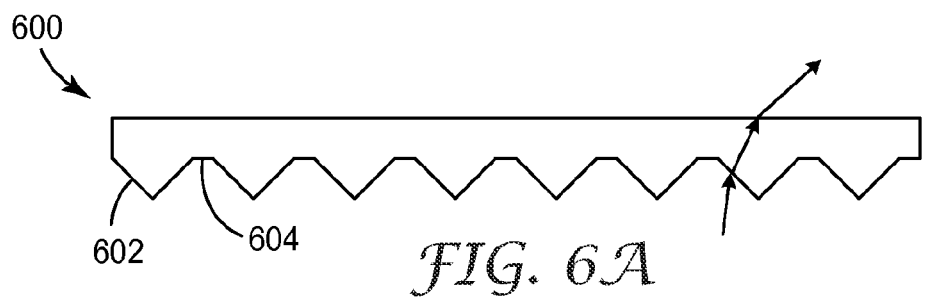
FIGS. 6A-6C schematically illustrate different embodiments of enhanced uniformity film usable in embodiments of the present invention.

Many different shapes and types of enhanced uniformity film (EUF) 130 may be used between the light sources 116 and the punch-through diffuser 122. A few examples are presented below, but are not intended to limit the invention. A first embodiment of an EUF 600 is schematically illustrated in FIG. 6A. This EUF 600 includes a number of ribs 602 on its surface, with flat regions 604 between the ribs 602. The ribs 602 need not be all the same size and may vary in width, pitch, height and apex angle. In addition, the size of the flat regions 604 may vary.

Figure 6B:
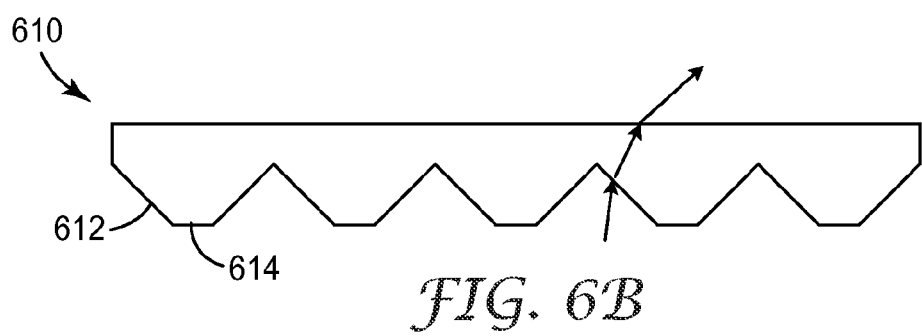

Another embodiment of EUF 610 is schematically illustrated in FIG. 6B. This EUF 610 includes a number of ribs 612 on its surface. In this case, the ribs 612 are truncated with a flat region 614 instead of an apex.

Figure 6C:
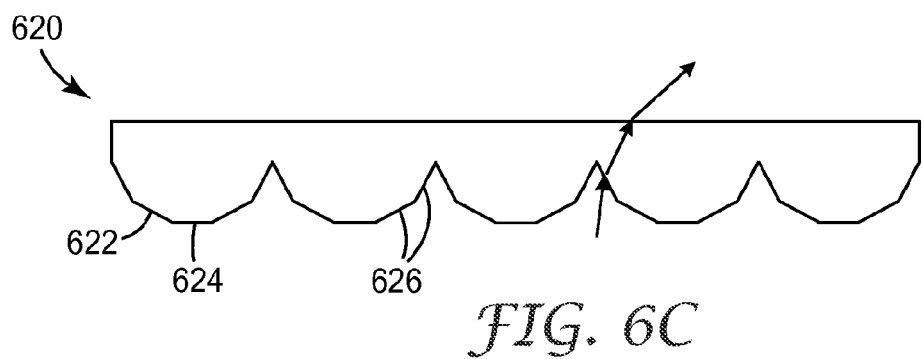

Another embodiment of EUF 620 is schematically illustrated in FIG. 6C. This EUF 620 includes number of ribs 622 that are truncated with flat regions 624. Additionally, the sides of the ribs include a number of facets 626. The illustrated embodiment includes two facets on either side of the rib 622, but the number of facets may also be different. The facets may be flat or curved.

Other combinations of shapes may be used for the EUF. For example, an EUF may combine flat regions between truncated ribs. Additionally, the EUF may use a two-dimensional light diverting structure, for example a pyramid or other type of protruding shape, or some type of recess, instead of a rib.

Numerically Modeled Examples

Several different configurations of backlight have been numerically modeled to analyze the ability of a punch-through diffuser to improve the uniformity of illuminance while maintaining high light throughput.

Diffusive scattering was included using a Henyey-Greenstein volume scattering model. This model is dependent on two parameters: the scattering parameter and the scattering anisotropy coefficient. The scattering parameter, U, is given in units of inverse distance (1/mm) and represents the density of scattering centers or the probability of scattering per unit propagation distance. In the following numerical models, the typical value used for titanium dioxide beads was $U_{titania}=33$, although this value could change depending on the assumed loading for the titanium dioxide. The scattering parameter for the polystyrene beads, $U_{poly}$, was typically varied as one of the model parameters.

The second parameter is the scattering anisotropy coefficient, G, which establishes the probability distribution in the direction of a single scattering event. When G is close to 1, the scattering distribution is concentrated in the forward direction. When G=0, the distribution is spherically symmetric and G=−1 the scattering direction is substantially backward. A value of G=0.5 is a wide angular distribution somewhat biased in the forward direction. The best fit to titanium dioxide and polystyrene in the host acrylate polymer discussed above are:

$G_{titania}=0.5$ and
$G_{poly}=0.93$.

These values are dependent, at least in part, on particle size and refractive index difference between the particle and the host. Unless otherwise stated, the model assumed the G values provided above.

In all cases the lamps were assumed to be 3 mm in diameter and arranged in a plane, and the lower reflector was assumed to be 5.5 mm below the plane of the lamp centers.

One of the goals of modeling was to explore what combinations of elements produced high luminance uniformity where the backlight is thin, since this remains one of the significant technical challenges for backlights. In conventional backlights, the thinner the backlight, i.e. the lower the value of D, the separation between the back reflector and the first layer above the lamps, the higher the non-uniformity. This occurs because the deeper cavity provides more space for the light to spread out laterally from the lamps. When the cavity is thinner, the light is more concentrated on the areas above the lamps, with the result that the non-uniformity is increased.

Example 1

Punch-Through Diffuser and Reflective Polarizer

Figure 8A:
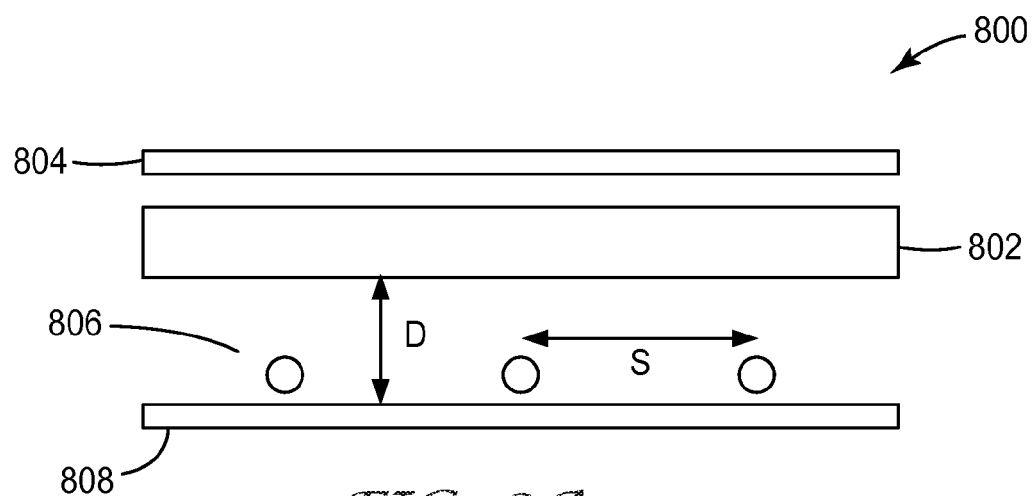
FIG. 8A schematically illustrates the model used in Numerical Example No. 1.
Figure 8B:
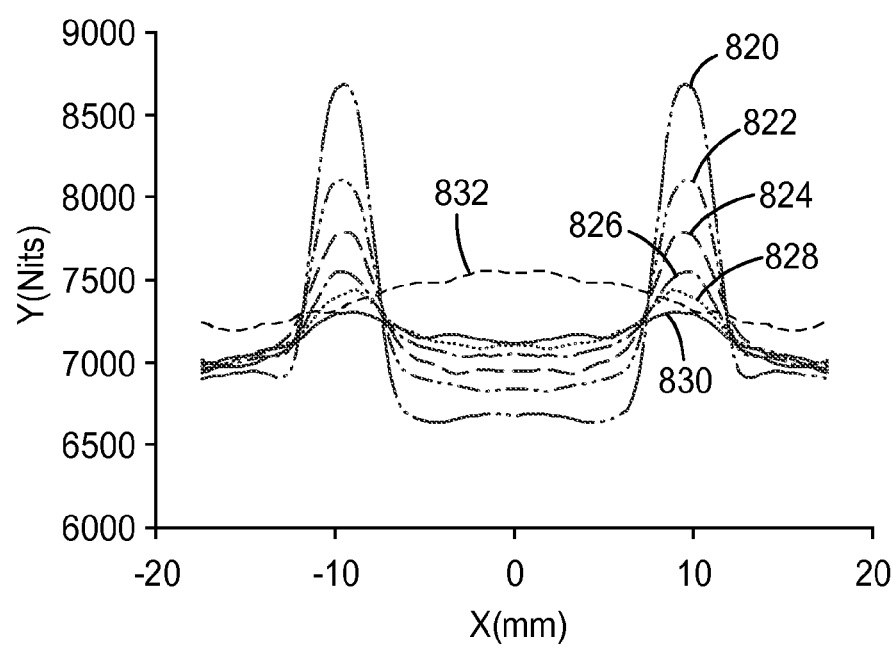
FIG. 8B presents a graph of luminance vs. position for Numerical Example No. 1 for various values of scattering parameter $U_{poly}$.

The first modeled example is discussed with reference to FIGS. 8A-8C. The model backlight 800 is based on a diffuser 802 with a reflective polarizer 804 above the diffuser. The lamps 806 had a center to center spacing of S=35 mm and the separation between the rear reflector 808 and the diffuser 802 was 20 mm. FIG. 8B shows the calculated luminance as a function of position across the backlight 800 for increasing values of $U_{poly}$, which relates to increasing concentrations of polystyrene bead in the diffuser 800. The assumed value of $U_{titania}$, was 33 $mm^{-1}$. The $U_{poly}$ values for the different curves are listed in Table III. Curve 832 shows the luminance of a standard diffusing plate having a single pass transmission of 65%.

TABLE III

Figure 8C:
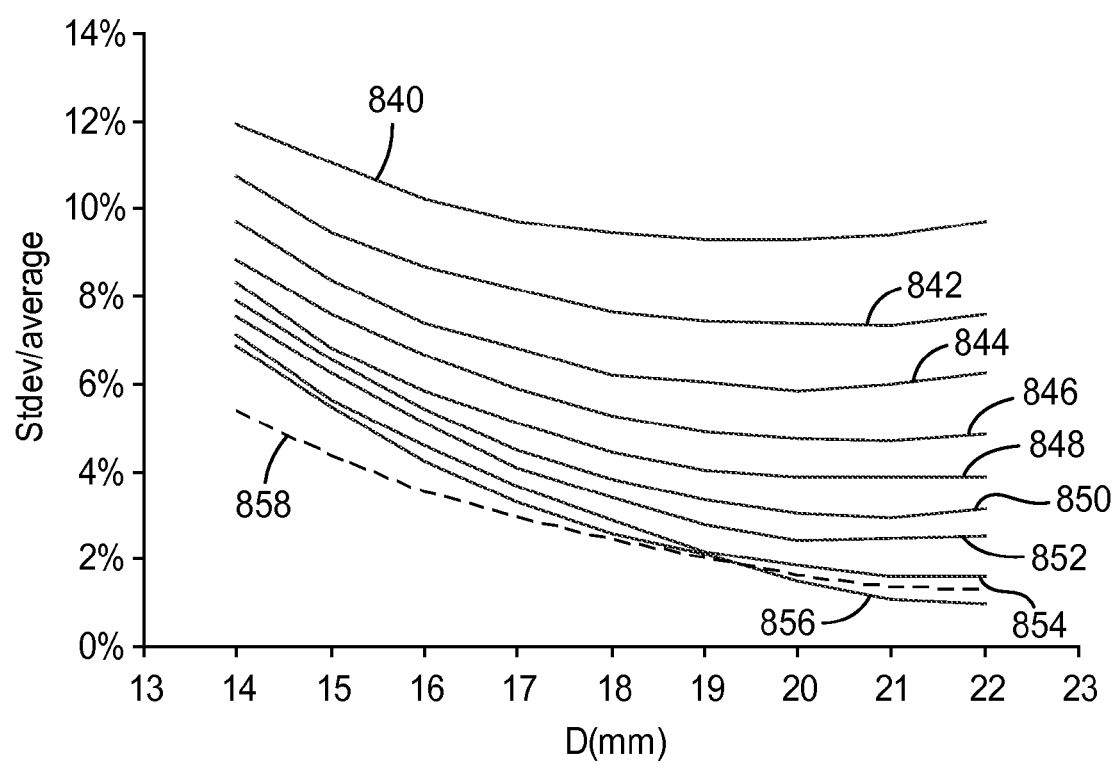
FIG. 8C presents a graph of luminance uniformity vs. backlight cavity depth for Numerical Example No. 1 for various values of scattering parameter $U_{poly}$.

| $U_{poly}$ values for Example 1 | | |
|---|---|---|
| $U_{poly}$ | FIG. 8B - curve no. | FIG. 8C - curve no. |
| 0 | 820 | 840 |
| 10 |  | 842 |
| 20 | 822 | 844 |
| 30 |  | 846 |
| 40 | 824 | 848 |
| 50 |  | 850 |
| 60 | 826 | 852 |
| 80 | 828 | 854 |
| 100 | 830 | 856 |

FIG. 8C shows the luminance uniformity as a function of D (mm) for the different values of $U_{poly}$ listed in Table III. Curve 858 represents the luminance for the conventional 65% transmitting diffuser plate.

In this model, the luminance uniformity of the punch-through diffuser is equal to or improves that of the standard diffuser when the polystyrene bead concentration is high and the cavity depth, D, is relatively high.

Example 2

Punch-Through Diffuser with Brightness Enhancement and Reflective Polarizer

Figure 9A:
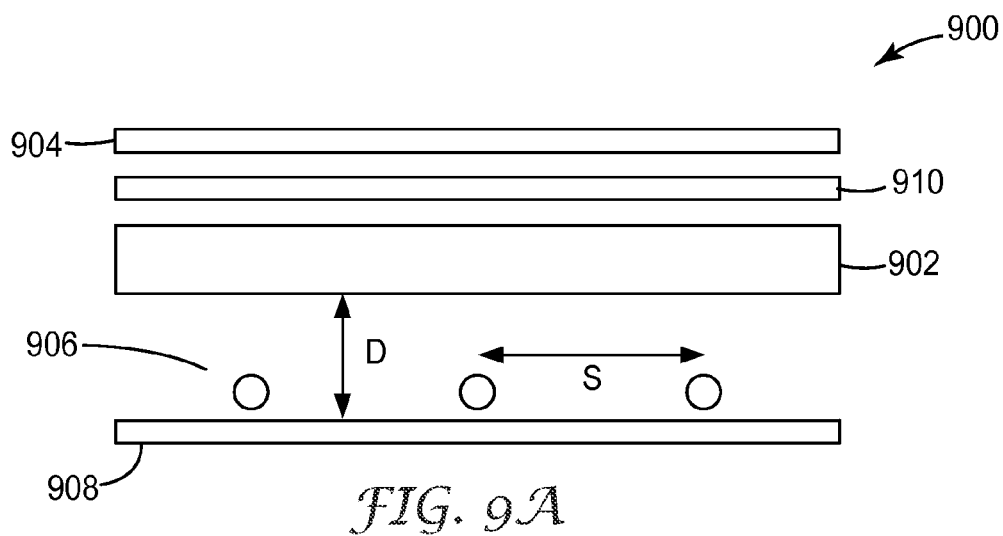
FIG. 9A schematically illustrates the model used in Numerical Example No. 2.

The second modeled example is discussed with reference to FIGS. 9A and 9B. The model backlight 900 was based on a backlight having a punch-through diffuser 902, a reflective polarizer 904 and a brightness enhancement film 910. The brightness enhancement film 910 was modeled as a prismatic film having uniformly high prismatic ribs on a 50 μm pitch with a 90° apex angle. Lamps 906 were placed above a rear reflector 908. The lamps 906 had a center to center spacing of S=35 mm and the separation between the rear reflector 908 and the diffuser 902 was 20 mm.

Figure 9B:
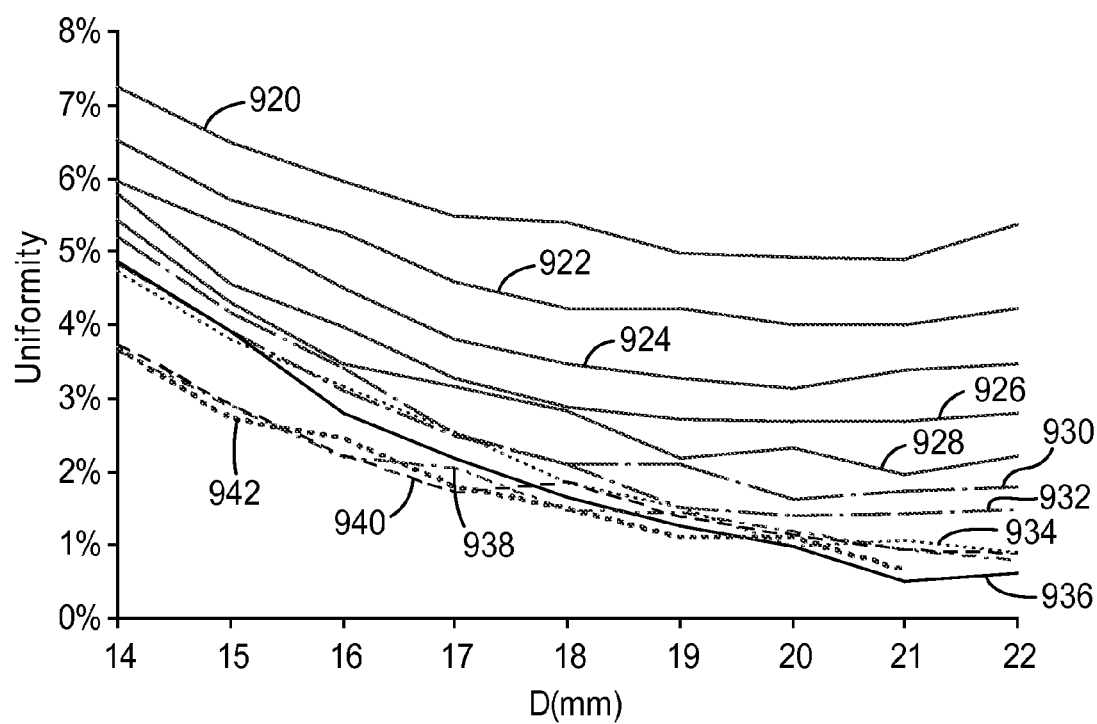
FIG. 9B presents a graph of luminance uniformity vs. backlight cavity depth for Numerical Example No. 2 for various values of scattering parameter $U_{poly}$.

FIG. 9B shows the calculated luminance uniformity as a function of cavity depth, D, for various values of $U_{poly}$, which relates to increasing concentrations of polystyrene beads in the diffuser 902. The assumed value of $U_{titania}$ was 33 mm$^{-1}$. The $U_{poly}$ values for the different curves are listed in Table VI.

TABLE IV $U_{poly}$ values for Example 2

| $U_{poly}$ | FIG. 9B |
|---|---|
| 0 | 920 |
| 10 | 922 |
| 20 | 924 |
| 30 | 926 |
| 40 | 928 |
| 50 | 930 |
| 60 | 932 |
| 80 | 934 |
| 100 | 936 |

In addition, curves 938, 940 and 942 represent the results for a conventional diffuser having a single pass transmission of 60%, 65% and 70% respectively. As with the previous example, the illuminance uniformity obtained using the punch-through diffuser is about the same in performance as that of the convention diffuser when the cavity depth, D, is large (>20 mm) and the value of $U_{poly}$ is high.

Example 3

Punch-Through Diffuser with Reflective Polarizer, Brightness Enhancement and EUF The third modeled example is discussed with reference to FIGS. 10A-10C. The model backlight 1000, schematically illustrated in FIG. 10A was based on a backlight having a punch through diffuser 1002, a reflective polarizer 1004 and a brightness enhancement film 1010. Lamps 1006 were placed above a rear reflector 1008. The lamps 1006 had a center to center spacing of S=35 mm and the separation between the rear reflector 1008 and the diffuser 1002 was 20 mm. A sheet of EUF 1012 was placed below the punch-through diffuser 1002, and a 2 mm thick clear plate 1014 was placed below the EUF 1012.

The EUF 1012 was shaped with ribs on a 50 μm pitch, without any spaces between the ribs. Different rib designs were used, as shown in FIG. 10B. The ribs were truncated prisms, similar in shape to those illustrated in FIG. 6B. The sides of the ribs were sloped at different angles, represented by the angle, w, between the two sides, i.e. the angle that would be the apex angle if the ribs were not truncated. The different values of ω are shown in Table V.

TABLE V

Values of ω in Example 3

Figure 10A:
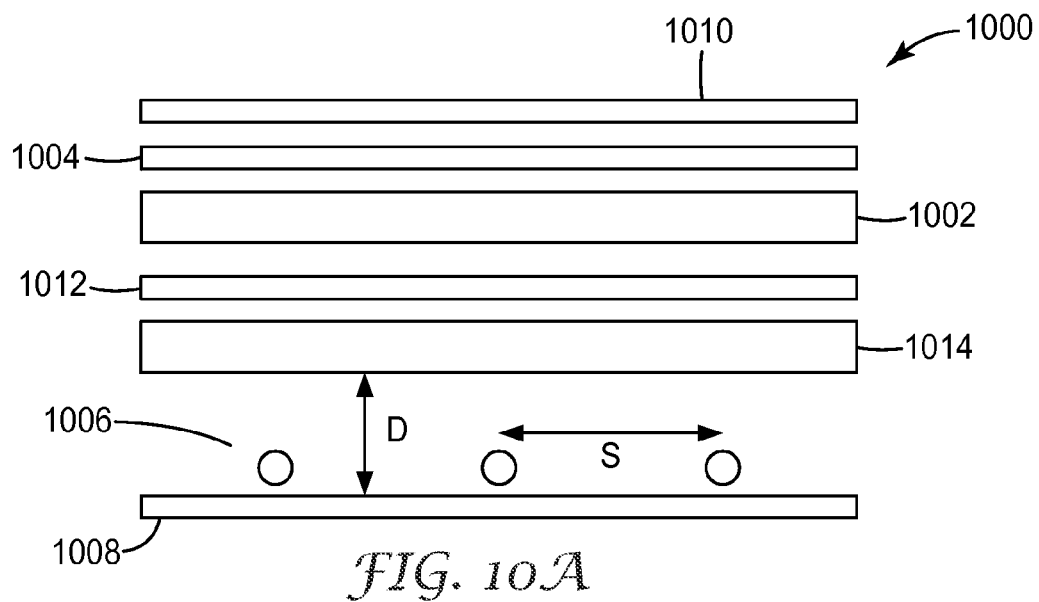
FIG. 10A schematically illustrates the model used in Numerical Example No. 3.
Figure 10B:
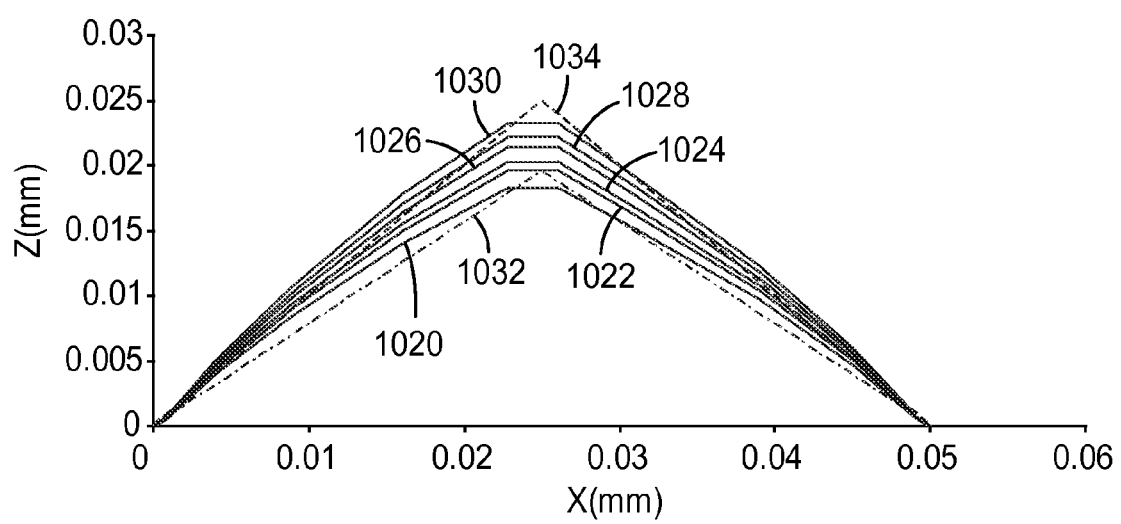
FIG. 10B presents a graph showing various shapes of EUF used in Numerical Example No. 3.

| ω (deg) | FIG. 10B |
|---|---|
| 104 | 1020 |
| 100 | 1022 |
| 98 | 1024 |
| 95 | 1026 |
| 93 | 1028 |
| 90 | 1030 |
| 104* | 1032 |
| 90* | 1034 |

The starred values represent the non-truncated prisms shown in FIG. 10B, having apex angles of 104° and 90°.

Figure 10C:
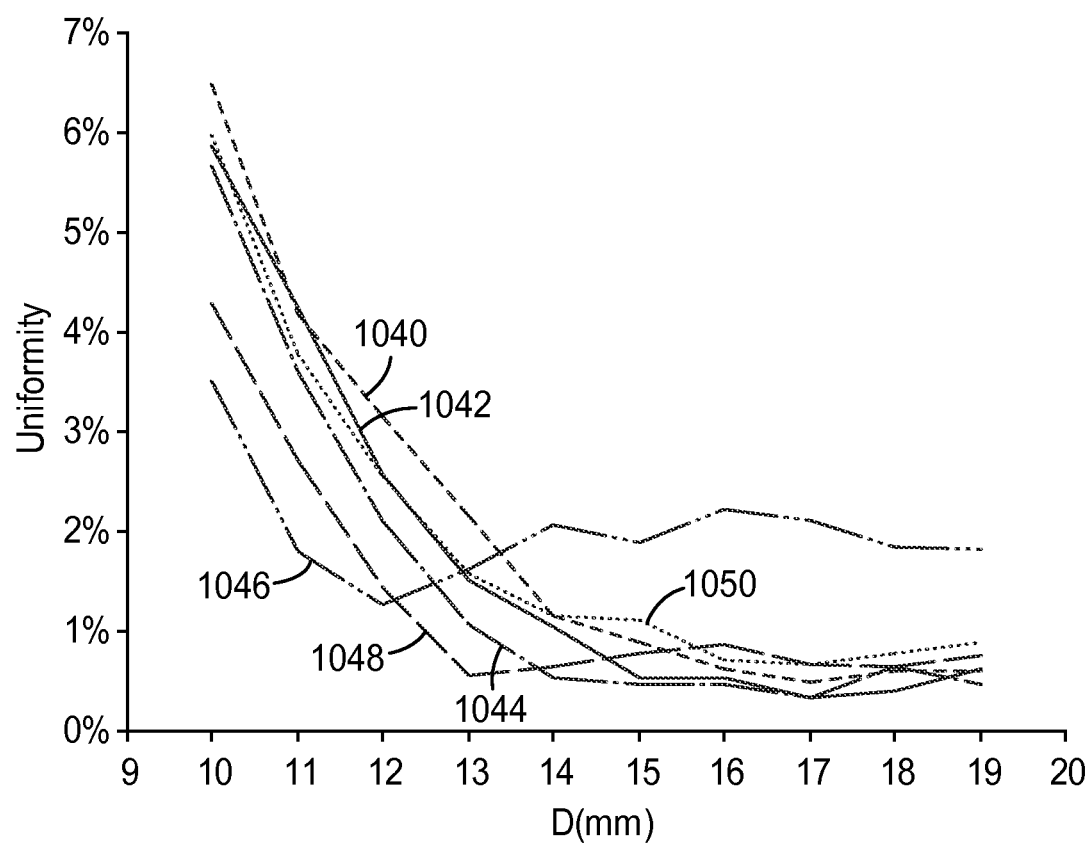
FIG. 10C presents a graph of luminance uniformity vs. backlight cavity depth for Numerical Example No. 3 for various shapes of EUF.

FIG. 10C shows the calculated luminance uniformity as a function of cavity depth, D, for a value of $U_{poly}$=0.48, and for various shapes of EUF. The assumed value of $U_{titania}$ was 33 mm$^{-1}$. The shapes of EUF used to produce the different curves are listed in Table VI. The angle, ω, is the apex angle for non-truncated prisms and the angle between the prism sides where the prisms are truncated.

TABLE VI

EUF shapes for Example 3

| Curve | EUF Shape |
|---|---|
| 1040 | truncated, ω = 104° |
| 1042 | truncated, ω = 100° |
| 1044 | truncated, ω = 98° |
| 1046 | non-truncated, ω = 95° |
| 1048 | non-truncated, ω = 100° |
| 1050 | non-truncated, ω = 105° |

As can be seen with this example, the luminance non-uniformity is very small, less than 1%, for several different EUF shapes for cavity depths D that are as low as 13 mm. This is significantly better performance than in Examples 1 and 2 where sub 1% nonuniformity was obtained with deeper cavities, around 20 mm and thicker.

Example 4

Figure 11A:
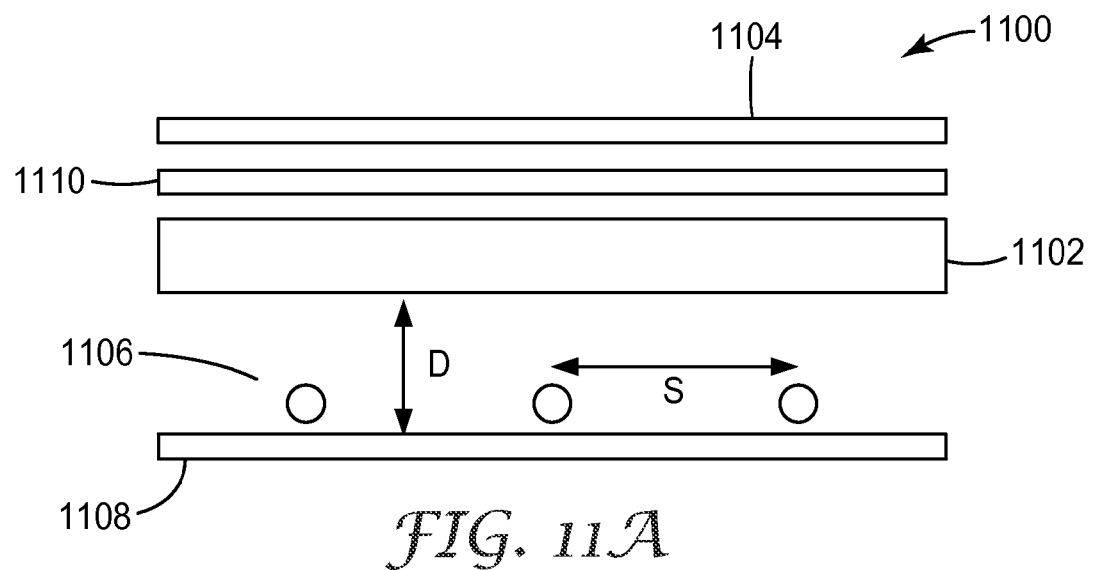
FIG. 11A schematically illustrates the model used in Numerical Example No. 4.

Punch-Through Diffuser with Reflective Polarizer, Rhombohedron Brightness Enhancement and EUF The fourth modeled example is discussed with reference to FIGS. 11A and 11B. The model backlight 1100, schematically illustrated in FIG. 11A was based on a backlight having a punch through diffuser 1102, a reflective polarizer 1104 and a rhombohedron brightness enhancement film 1110. Lamps 1106 were placed above a rear reflector 1108. The lamps 1106 had a center to center spacing of S=35 mm and the separation between the rear reflector 1108 and the diffuser 1102 was 20 mm.

Figure 11B:
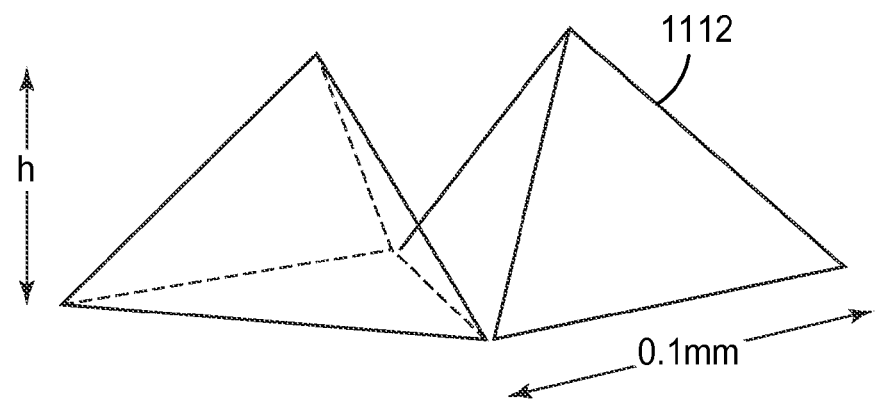
FIG. 11B schematically illustrates an embodiment of a 2-D light diverting film used in Numerical Example No. 4.

The rhombohedron brightness enhancement film 1110 was like that shown in FIG. 5, except that the pyramids 1112 had a triangular base, as shown in FIG. 11B. The pyramid base was 0.1 mm and the pyramid height, h, was 0.055 mm, and so the angle, α, was 78°. Thus, the pyramid did not form a corner cube, but was more sharply peaked than a corner cube.

Figure 11C:
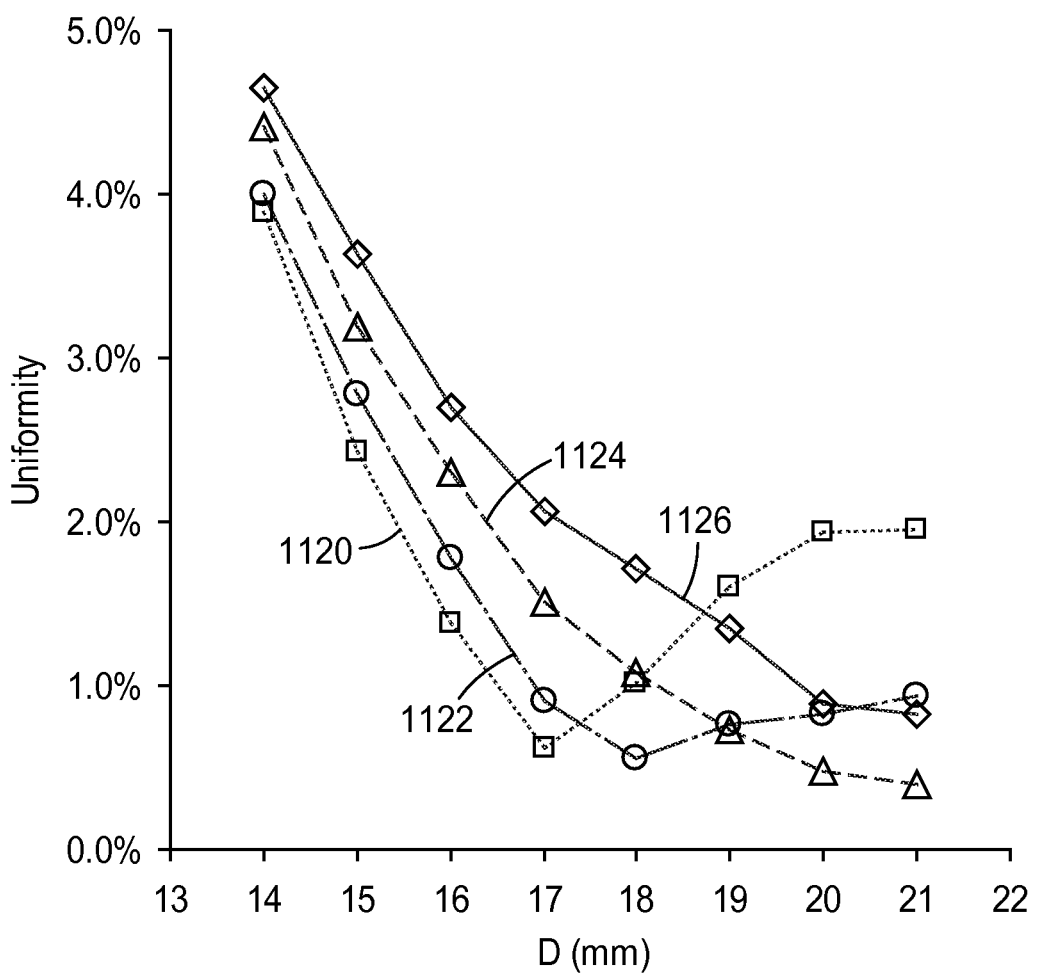
FIG. 11C presents a graph of luminance uniformity vs. backlight cavity depth for Numerical Example No. 4 for various values of scattering parameter $U_{poly}$.

The luminance uniformity is shown in FIG. 11C for various values of $U_{poly}$: 0 mm$^{-1}$ (curve 1120), 20 mm$^{-1}$ (curve 1122), 50 mm$^{-1}$ (curve 1124) and 100 mm$^{-1}$ (curve 1126). As can be seen, the uniformity reaches below 1% for all the different values of $U_{poly}$. Interestingly, the uniformity dips below 1% for low values of $U_{poly}$ (low concentrations of polyester beads) at thinner cavity depth than for higher polystyrene bead concentrations. Also, note that a uniformity of less than 1% was obtained at a cavity depth of 17 mm without use of an EUF.

Experimental Examples

Example 5

The luminance and luminance uniformity were measured for a film assembly like that shown in FIG. 10A, with an EUF below the diffuser and a prismatic brightness enhancing film and reflective polarizer film above the diffuser. In all cases, the prismatic brightness enhancing film was BEFIII-10T and the reflective polarizer film was a multilayer optical film polarizer, model DBEF-D400, both available from 3M Company, St. Paul. The testbed used 3 mm diameter cold cathode fluorescent lamps on a 35 mm center-to-center spacing. The lamp centers were 5.5 mm above a diffusive reflector taken from a Sony model no. KDL-40XBR4 television. The value of D (distance from reflector to lowest film above the lamps) was 13 mm.

Optical data corresponding to this film stack were collected using a CCD imaging photometer, radiometer and colorimeter (Model PM-1613F from Radiant Imaging Inc., Duvall, Wash.). The CCD camera provided data on brightness versus position on the film stack. Uniformity values were calculated from raw data as follows. First, the positional data were averaged in a direction perpendicular to the long axis of the lamps in order to provide an average cross-section for the usable area of the test bed. Then a rolling average of this cross-section data was subtracted from the original cross-sectional data to show oscillations of the data across the test fixture. Uniformity as a relative luminance value was then calculated as a standard deviation of the oscillations divided by the average brightness and reported as a percentage.

Figure 7:
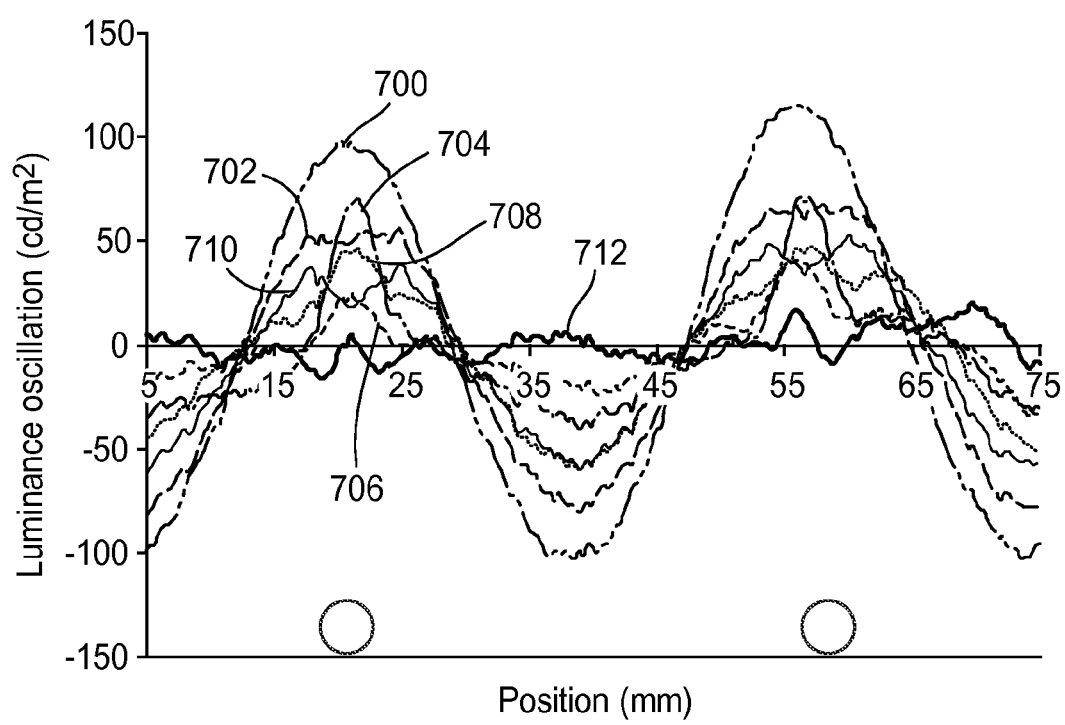
FIG. 7 shows the measured luminance above two lamps for different combinations of light management film.

The oscillation of the relative luminance is shown as a function of position across two lamps in the backlight assembly in FIG. 7. The horizontal axis is a measure of relative position across the face of the film stack, and the vertical axis is the computed oscillation of relative luminance value described above. The luminance curves correspond to the various film combinations described below in Table VII.

TABLE VII

Film Combinations in Experimental Example (FIG. 7).

| Curve No. | EUF | Diffuser | Uniformity (%) |
|---|---|---|---|
| 700 | None | 65% diffuser plate | 3.26 |
| 702 | EUF8 | 65% diffuser plate | 2.05 |
| 704 | EUF8 | PTD1 - 21 μm | 1.32 |
| 706 | EUF8 | PTD1 - 25 μm | 1.31 |
| 708 | EUF8 | PTD1 - 33 μm | 1.7 |
| 710 | 100-BEF | 65% diffuser plate | 1.46 |
| 712 | 100-BEF | PTD1 - 25 μm | 0.87 |

The column labeled "EUF" describes the film used in the position of the EUF 1012 shown in FIG. 10A. Curve 700 was obtained without any film at that position. "EUF8" refers to an EUF film having a value of ω of 104°, like that described by curve 1020 in FIG. 10B. 100-BEF is a prism film shaped like the film shown in FIG. 3A, with an apex angle of 100°.

The column labeled "Diffuser" describes the diffuser used in the position of the diffuser 1002 shown in FIG. 10A. The "65% Diffuser Plate" was a 2 mm thick conventional diffuser plate obtained from television, similar to that found in a Sony model KDL-40XBR4. PTD1 refers to the punch-through diffuser whose formulation is listed above in Table II. The dimension refers to the thickness of the PTD1 diffuser. In those arrangements that used the PTD1 diffuser, a 2 mm clear acrylic plate was placed below the EUF film for support. The value of D was measured to the lower surface of this plate.

As can be seen from the graph in FIG. 7 and Table VII, the best uniformity was obtained for the 25 μm thick PTD1 diffuser with the 100° prism film used as EUF. The uniformity was better than 1%, with a cavity depth of only 13 mm. Thus, the punch through diffuser is effective at spreading the light in a backlight to make the illumination of an LCD panel uniform.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices. For example, it should be understood that light-diverting surfaces may take on many different types of shapes that are not discussed here in detail, including surfaces with light-diverting elements that are random in position, shape, and/or size. In addition, while the exemplary embodiments discussed above are directed to light-diverting surfaces that refractively divert the illumination light, other embodiments may diffract the illumination light, or may divert the illumination light through a combination of refraction and diffraction.

We claim:

1. An optical device, comprising:
a first film having a first side and a second side, the first film being characterized when illuminated by light at the first side by a first fraction of broadly diffused transmitted light and a second fraction of narrowly diffused transmitted light; and
a second film disposed to the second side of the first film, the second film having at least one free light-diverting surface;
wherein the first fraction is characterized by a half angle of diffusion of $s_1$ and the second fraction is characterized by a half angle of diffusion of $s_2$, the ratio $s_1/s_2$ being greater than 3.

2. A device as recited in claim 1, wherein the ratio $s_1/s_2$ is greater than 5.

3. A device as recited in claim 1, wherein the ratio $s_1/s_2$ is greater than 10.

4. A device as recited in claim 1, wherein the ratio of optical power in the first fraction divided by the optical power in the second fraction is between 1 and 10.

5. A device as recited in claim 1, further comprising a third film disposed to the first side of the first film, the third film having at least one free surface that diverts light.

6. A device as recited in claim 1, wherein the light diverting surface reflects more than 50% of the light transmitted through the first film that is incident substantially on axis back towards the first film.

7. A device as recited in claim 1, wherein the light diverting surface reflects more than 50% of the light that is incident within the angular cone of breadth $s_2$ centered on axis.

8. A device as recited in claim 1, wherein the light diverting surface turns at least some of the transmitted light by more than 20°.

9. A device as recited in claim 1, wherein the first film comprises a first set of diffusing particles embedded in a transparent material, the first set of diffusing particle being associated with diffusing the first fraction.

10. A device as recited in claim 9, wherein the first film further comprises a second set of diffusing particles embedded within the transparent material, the second set of diffusing particles being associated with the second fraction.

11. A device as recited in claim 1, wherein the first film further comprises a diffusing surface associated with the second fraction.

12. A device as recited in claim 1, wherein the second film comprises a plurality of ribs on a surface facing away from the first film.

13. A device as recited in claim 12, wherein at least one of the ribs is a prismatic rib having two flat sides forming an apex.

14. A device as recited in claim 12, wherein a first rib has a first height and a second rib has a second height different form the first height.

15. A device as recited in claim 12, wherein at least one of the ribs has a height that varies along the length of the rib.

16. A device as recited in claim 12, wherein at least one of the ribs has faceted sides.

17. A device as recited in claim 12, wherein at least one of the ribs has curved sides.

18. A device as recited in claim 1, further comprising a reflective polarizer disposed proximate the second side of the first film.

19. A device as recited in claim 1, further comprising a reflector disposed to the first side of the first film and at least one light source disposed between the reflector and the first film.

20. A device as recited in claim 1, further comprising a liquid crystal display (LCD) panel disposed proximate the second side of the first film and a controller coupled to the LCD panel for controlling images displayed by the LCD panel.

21. An optical device, comprising: a first film having a first side and a second side and a diffuse scattering optical density between 0.5 and 3; and
    a second film disposed proximate the first side of the first film with at least one free light diverting surface that diverts light transmitted through the first film;
    wherein the first fraction is characterized by a half angle of diffusion of $_{s1}$ and the second fraction is characterized by a half angle of diffusion of $_{s2}$, the ratio $_{s1/s2}$ being greater than 3.

22. A device as recited in claim 21, further comprising a third film disposed to the second side of the first film, the third film having at least one free surface that diverts light.

23. A device as recited in claim 21, wherein the light diverting surface reflects more than 50% of the light transmitted through the first film that is incident substantially on axis back towards the first film.

24. A device as recited in claim 21, wherein the light diverting surface turns at least some of the transmitted light by more than 20°.

25. A device as recited in claim 21, wherein the first film comprises a first set of diffusing particles embedded in a transparent material, the first set of diffusing particle being associated with diffusing a first fraction of transmitted light.

26. A device as recited in claim 25, wherein the first film further comprises a second set of diffusing particles embedded within the transparent material, the second set of diffusing particles being associated with a second fraction of transmitted light having a half angle of diffusion less than the half angle of diffusion of the first fraction.

27. A device as recited in claim 25, wherein the first film further comprises a diffusing surface associated with a second fraction of transmitted light having a half angle of diffusion less than the half angle of diffusion of the first fraction.

28. A device as recited in claim 21, wherein the second film comprises a plurality of ribs on a surface facing away from the first film.

29. A device as recited in claim 28, wherein at least one of the ribs is a prismatic rib having two flat sides forming an apex.

30. A device as recited in claim 28, wherein a first rib has a first height and a second rib has a second height different form the first height.

31. A device as recited in claim 28, wherein at least one of the ribs has a height that varies along the length of the rib.

32. A device as recited in claim 28, wherein at least one of the ribs has faceted sides.

33. A device as recited in claim 28, wherein at least one of the ribs has curved sides.

34. A device as recited in claim 21, further comprising a reflective polarizer disposed proximate the second side of the first film.

35. A device as recited in claim 21, further comprising a liquid crystal display (LCD) panel disposed proximate the second side of the first film and a controller coupled to the LCD panel for controlling images displayed by the LCD panel.

36. An optical device, comprising:
    a light diffusing means for diffusing light by forming a first broadly diffuse fraction and a second narrowly diffuse fraction when illuminated by input light; and
    a first light diverting means for diverting at least a portion of the light transmitted through the light diffusing means;
    wherein the first fraction is characterized by a half angle of diffusion of $s_1$ and the second fraction is characterized by a half angle of diffusion of $s_2$, the ratio $s_1/s_2$ being greater than 3.

37. A device as recited in claim 36, wherein the first light diverting means also reflects a portion of the light transmitted through the light diffusing means.

38. A device as recited in claim 36, further comprising a second light diverting means for diverting a least a portion of light before being incident on the light diffusing means.

* * * * *